(12) United States Patent
Weaver et al.

(10) Patent No.: US 9,771,511 B2
(45) Date of Patent: Sep. 26, 2017

(54) METHOD AND SYSTEM FOR SERVICING A WELLBORE

(75) Inventors: Jimmie D. Weaver, Duncan, OK (US); Tingji Tang, Spring, TX (US); Philip D. Nguyen, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 734 days.

(21) Appl. No.: 13/568,977

(22) Filed: Aug. 7, 2012

(65) Prior Publication Data

US 2014/0041869 A1    Feb. 13, 2014

(51) Int. Cl.
*E21B 37/06* (2006.01)
*C09K 8/528* (2006.01)
(Continued)

(52) U.S. Cl.
CPC ............ *C09K 8/528* (2013.01); *C09K 8/5751* (2013.01); *C09K 8/68* (2013.01); *E21B 37/06* (2013.01); *E21B 41/02* (2013.01)

(58) Field of Classification Search
CPC ...................................................... C09K 8/528
(Continued)

(56) References Cited

U.S. PATENT DOCUMENTS 3,891,394 A   6/1975 Smith et al.
4,779,679 A * 10/1988 Snavely, Jr. ............ C09K 8/528
166/279
(Continued)

FOREIGN PATENT DOCUMENTS

EP    0402996 A1   12/1990
GB    2488630 A     9/2012
(Continued)

OTHER PUBLICATIONS

Next™ Sand brochure entitled, "A Radically High Performance Silt, Sediment and Turbidity Media," Mar. 2010, 2 pages, Next™ Filtration Technologies, Inc., www.nextfiltration.com/lit.html.
(Continued)

*Primary Examiner* — Angela M DiTrani
*Assistant Examiner* — Andrew H Sue-Ako
(74) *Attorney, Agent, or Firm* — Craig W. Roddy; Baker Botts L.L.P.

(57) ABSTRACT

A wellbore servicing composition comprising a base fluid, the base fluid comprising a substantially aqueous fluid, a brine, an emulsion, an invert emulsion, an oleaginous fluid, or combinations thereof, a quantity of template assisted crystallization beads, and a wellbore servicing fluid component, the wellbore servicing fluid component comprising a quantity of proppant, a quantity of gravel, or combinations thereof. A wellbore servicing system comprising a flowpath, the flowpath comprising at least one component of wellbore servicing equipment, and a conduit extending from the at least one component of wellbore servicing equipment to a wellbore, and a wellbore servicing fluid disposed within the flowpath, wherein the wellbore servicing fluid comprises a plurality of template assisted crystallization beads. A wellbore servicing method comprising forming a wellbore servicing fluid comprising a quantity of template assisted crystallization beads, and introducing the wellbore servicing fluid into a wellbore, a subterranean formation, or combinations thereof.

11 Claims, 5 Drawing Sheets

(51) Int. Cl.
*C09K 8/575* (2006.01)
*C09K 8/68* (2006.01)
*E21B 41/02* (2006.01)

(58) Field of Classification Search
USPC .......................................... 166/278; 507/231
See application file for complete search history.

(56) References Cited

U.S. PATENT DOCUMENTS

| | | | |
|---|---|---|---|
| 4,787,455 A * | 11/1988 | Snavely, Jr. ........... | C09K 8/528 166/279 |
| 5,322,121 A | 6/1994 | Hrachovy | |
| 5,893,416 A | 4/1999 | Read | |
| 6,059,034 A | 5/2000 | Rickards et al. | |
| 6,330,916 B1 | 12/2001 | Rickards et al. | |
| 2002/0131923 A1 | 9/2002 | Acton et al. | |
| 2006/0243670 A1 | 11/2006 | Pinchin | |
| 2007/0044963 A1 * | 3/2007 | MacDougall ................. | 166/278 |
| 2007/0051513 A1 * | 3/2007 | Heins ...................... | E21B 43/40 166/265 |
| 2007/0187090 A1 * | 8/2007 | Nguyen .................. | E21B 37/06 166/249 |
| 2007/0284100 A1 | 12/2007 | Collins et al. | |
| 2011/0257052 A1 * | 10/2011 | Grott ...................... | C09K 8/582 507/269 |
| 2011/0297382 A1 * | 12/2011 | Tirio et al. ................. | 166/308.1 |
| 2012/0181028 A1 | 7/2012 | Daussin et al. | |
| 2013/0118987 A1 * | 5/2013 | VerMurlen .............. | C02F 1/685 210/696 |
| 2014/0041874 A1 | 2/2014 | Schultheiss et al. | |

FOREIGN PATENT DOCUMENTS

| | | |
|---|---|---|
| WO | 2014025645 A1 | 2/2014 |
| WO | 2014025649 A1 | 2/2014 |

OTHER PUBLICATIONS

Next™ Sand brochure entitled, "Case Study: Prefiltration (SDI reduction) for Reverse Osmosis Boiler Makeup Water System," 2010, 1 page, Next™ Filtration Technologies, Inc., www.nextfiltration.com/lit.html.
Next™ Sand brochure entitled, "Case Study: Filtration Performance and Particle Analysis, next-Sand vs. MultiMedia," 2010, 1 page, Next™ Filtration Technologies, Inc., www.nextfiltration.com/lit.html.
Next™ Sand brochure entitled, "Case Study: Filtration Performance: Turbidity & SDI Reduction, Particle Analysis nextSand vs. MultiMedia," 2010, 1 page, Next™ Filtration Technologies, Inc., www.nextfiltration.com/lit.html.
Johnson, Tod S., et al., "Technical Report: nextSand Filter Media," Jun. 1, 2004, Next™ Filtration Technologies, Inc., www.nextfiltration.com/lit.html.
Material Safety Data Sheet, "next-Sand™ (14×40 mesh)," Mar. 2010, Next™ Filtration Technologies, Inc., www.nextfiltration.com/lit.html.
Next™ Scale Stop brochure entitled, "High Performance Scale Prevention, (Softener-Alternative) Media," Mar. 2010, 2 pages, Next™ Filtration Technologies, Inc., www.nextfiltration.com/lit.html.

Next™ Scale Stop brochure entitled, "Scale and Hardness Protection with Template Assisted Crystallization," Mar. 2010, 2 pages, Next™ Filtration Technologies, Inc., www.nextfiltration.com/lit.html.
Next™ Filtration Technologies, Inc. entitled, "Installation, Operation and Maintenance Manual," 2010, pp. 1-12, www.nextfiltration.com/lit.html.
Material Safety Data Sheet, "next-ScaleStop," Mar. 5, 2010, 4 pages, Next™ Filtration Technologies, Inc., www.nextfiltration.com/lit.html.
Patent application entitled "Wellbore Servicing System and Methods of Use," by Nathan Carl Schultheiss, et al., filed Aug. 7, 2012 as U.S. Appl. No. 13/569,054.
Smith, Karen R., "Can Physical Water Treatment Prevent and Control Scale? Exploring a New Technology Paradigm," Feb. 2007, 5 pages, Water Conditioning & Purification.
Watts®, "A Controlled Laboratory Evaluation of the Scale Prevention Properties of Watts OneFlow Technology," 1996, pp. 1-10, http://media.wattswater.com/DVGW-report-OneFlow.pdf.
Weist, Mara, et al., entitled "Evaluation of Alternatives to Domestic Ion Exchange Water Softeners," Apr. 26, 2011, Arizona State University, http://www.watereuse.org/sites/default/files/u3/Peter%20Fox.pdf.
Foreign communication from a related counterpart application—Invitation to Pay Additional Fees, PCT/US2014/034976, dated Aug. 18, 2014, 9 pages.
Next™ Scale Stop brochure entitled, "High performance scale prevention, (softener-alternative) media," revised Mar. 5, 2010, 2 pages, Next™ Filtration Technologies, Inc.
Foreign communication from a related counterpart application—Invitation to Pay Additional Fees, PCT/US2013/053479, Sep. 24, 2013, 8 pages.
Lower, Stephen, "'Catalytic' Water Treatment," XP-002712649, Apr. 30, 2013, 8 pages, http://www.chem1.com/CQ/catscams.html.
Vastyan, John, "Template-Assisted Crystallization: An Alternative to Salt-Based Water Softening," XP-002712648, Nov. 1, 2010, 4 pages, http://hpac.com/archive/template-assisted-crystallization.
Foreign communication from a related counterpart application—International Search Report and Written Opinion, PCT/US2013/053479, Nov. 13, 2013, 17 pages.
Office Action dated Aug. 15, 2014 (27 pages), U.S. Appl. No. 13/569,054, filed Aug. 7, 2012.
Filing receipt and specification for patent application entitled "Wellbore servicing system and methods of use," by Nathan Carl Schultheiss, et al., filed Aug. 7, 2012 as U.S. Appl. No. 13/569,054.
Filing receipt and specification for patent application entitled "Scale prevention treatment method, system, and apparatus for wellbore stimulation," by Lucas Kurtis Fontenelle, et al., filed Apr. 29, 2013 as U.S. Appl. No. 13/872,964.
Filing receipt and specification for patent application entitled "Scale prevention treatment method, system, and apparatus for wellbore stimulation," by Lucas Kurtis Fontenelle, et al., filed Apr. 29, 2013 as U.S. Appl. No. 13/873,016.
Teghidet, Hassiba, et al., "Calcite epitaxy on Au and Ag (1 1 1)," Journal of Crystal Growth, 2011, pp. 72-77, vol. 331, Elsevier B.V.
Zafiropoulou, A., et al., "The effect of benzotriazoles on calcium carbonate scale formation," Journal of Crystal Growth, 2000, pp. 477-480, vol. 219, Elsevier Science B.V.
"Filtersorb SP3—Alternative to Domestic & Commercial Water Softeners & Ion-Exchange Resins," XP055096236, May 13, 2011, 15 pages, Manheim, http://www.belkraft.com/FiltersorbSP3Presentation.pdf, WatchWater Technologies.
Foreign communication from a related counterpart application—International Search Report and Written Opinion, PCT/US2013/053434, Jan. 23, 2014, 13 pages.

\* cited by examiner

METHOD AND SYSTEM FOR SERVICING A WELLBORE

CROSS-REFERENCE TO RELATED APPLICATIONS

The subject matter disclosed herein is related to U.S. patent application Ser. No. 13/569,054, by Schultheiss et al. and entitled "Wellbore Servicing System and Methods of Use," which is filed concurrently herewith, and which is incorporated herein by reference in its entirety.

STATEMENT REGARDING FEDERALLY SPONSORED

Not applicable.

RESEARCH OR DEVELOPMENT

Not applicable.

REFERENCE TO A MICROFICHE APPENDIX

Not applicable.

BACKGROUND

Suitable fluid supplies are sometimes required to prepare wellbore servicing fluids employed in the performance of various wellbore servicing operations. Water supplies may be provided from various sources, such as municipal water, surface water, and flowback water from the wellbore. The water obtained from such sources of water, which will be used in the preparation of a wellbore servicing fluid may include multivalent cations, such as hard ions containing, for example, calcium and magnesium. For instance, flowback water from a subterranean formation may carry with it entrained hard ions from the formation. Relatively high concentrations of hard ions may lead to damage to wellbore servicing equipment, for example, through corrosion and/or the formation of scale on the inner flow surfaces of such wellbore servicing equipment. Accordingly, there is a need for effectively lowering the concentration of multivalent cations, such as hard ions, within fluid streams used in the preparation of a wellbore servicing fluid.

SUMMARY

Disclosed herein is a wellbore servicing composition comprising a base fluid, the base fluid comprising a substantially aqueous fluid, a brine, an emulsion, an invert emulsion, an oleaginous fluid, or combinations thereof, a quantity of template assisted crystallization beads, and a wellbore servicing fluid component, the wellbore servicing fluid component comprising a quantity of proppant, a quantity of gravel, or combinations thereof.

Also disclosed herein is a wellbore servicing system comprising a flowpath, the flowpath comprising at least one component of wellbore servicing equipment, and a conduit extending from the at least one component of wellbore servicing equipment to a wellbore, and a wellbore servicing fluid disposed within the flowpath, wherein the wellbore servicing fluid comprises a plurality of template assisted crystallization beads.

Further disclosed herein is a wellbore servicing method comprising forming a wellbore servicing fluid comprising a quantity of template assisted crystallization beads, and introducing the wellbore servicing fluid into a wellbore, a subterranean formation, or combinations thereof.

Further disclosed herein is a method of forming a proppant pack and/or a gravel pack within a subterranean formation, within a wellbore, or combinations thereof, wherein the proppant pack and/or the gravel pack comprises template assisted crystallization beads, the method comprising forming a wellbore servicing fluid comprising a quantity of template assisted crystallization beads, and introducing the wellbore servicing fluid into the wellbore, the subterranean formation, or combinations thereof.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION OF THE EMBODIMENTS

In the drawings and description that follow, like parts are typically marked throughout the specification and drawings with the same reference numerals, respectively. In addition, similar reference numerals may refer to similar components in different embodiments disclosed herein. The drawing figures are not necessarily to scale. Certain features of the invention may be shown exaggerated in scale or in somewhat schematic form and some details of conventional elements may not be shown in the interest of clarity and conciseness. The present invention is susceptible to embodiments of different forms. Specific embodiments are described in detail and are shown in the drawings, with the understanding that the present disclosure is not intended to limit the invention to the embodiments illustrated and described herein. It is to be fully recognized that the different teachings of the embodiments discussed herein may be employed separately or in any suitable combination to produce desired results.

Unless otherwise specified, use of the terms "connect," "engage," "couple," "attach," or any other like term describing an interaction between elements is not meant to limit the interaction to direct interaction between the elements and may also include indirect interaction between the elements described.

Unless otherwise specified, use of the terms "up," "upper," "upward," "up-hole," "upstream," or other like terms shall be construed as generally from the formation toward the surface or toward the surface of a body of water; likewise, use of "down," "lower," "downward," "downhole," "downstream," or other like terms shall be construed as generally into the formation away from the surface or away from the surface of a body of water, regardless of the wellbore orientation. Use of any one or more of the foregoing terms shall not be construed as denoting positions along a perfectly vertical axis.

Unless otherwise specified, use of the term "subterranean formation" shall be construed as encompassing both areas below exposed earth and areas below earth covered by water such as ocean or fresh water.

Relatively large amounts of water may be needed for the preparation of wellbore servicing fluids, examples of which include fracturing fluids or gravel-packing fluids. Common fluid sources used for preparing wellbore servicing fluids include water co-produced in the production of oil and gas, hereinafter referred to as produced water, surface water, and municipal water. Water obtained from any one or more of such sources may contain concentrations of dissolved multivalent ions, including hard ions (e.g., calcium ions, magnesium ions, strontium ions, aluminum ions, etc.). A fluid containing concentrations of dissolved multivalent ions, such as hard ions, may adversely affect the intended function of a wellbore servicing fluid formed therefrom and may contribute to the degradation and/or failure wellbore servicing equipment in contact with the fluid, such as through corrosion and/or the formation of scale (e.g., in the form of calcium and magnesium carbonates) on flow surfaces of such wellbore servicing equipment. Further, concentrations of such multivalent ions, including hard ions, may adversely affect the intended function of a wellbore servicing fluid and/or render the fluid unusable for use in wellbore servicing operations and/or for use in the production of a wellbore servicing fluid.

Disclosed herein are embodiments of wellbore servicing compositions, systems, and methods of using the same, as may be useful for effectively lowering the concentration of multivalent cations, such as hard ions, that may be present within a fluid that is to be used in the preparation of a wellbore servicing fluid, may be present within water produced from one or more intervals of a formation, may be present within a fluid injected into a wellbore (e.g., as an injection fluid, for example, for reservoir pressure maintenance or disposal). Particularly, embodiments of a wellbore servicing fluid comprising a quantity of template assisted crystallization beads and a system for the formulation of such wellbore servicing fluid and/or one or more components thereof. Also disclosed herein are methods for the utilization of such a wellbore servicing fluid in the performance of a wellbore servicing operation, as will be disclosed herein.

Figure 1A:
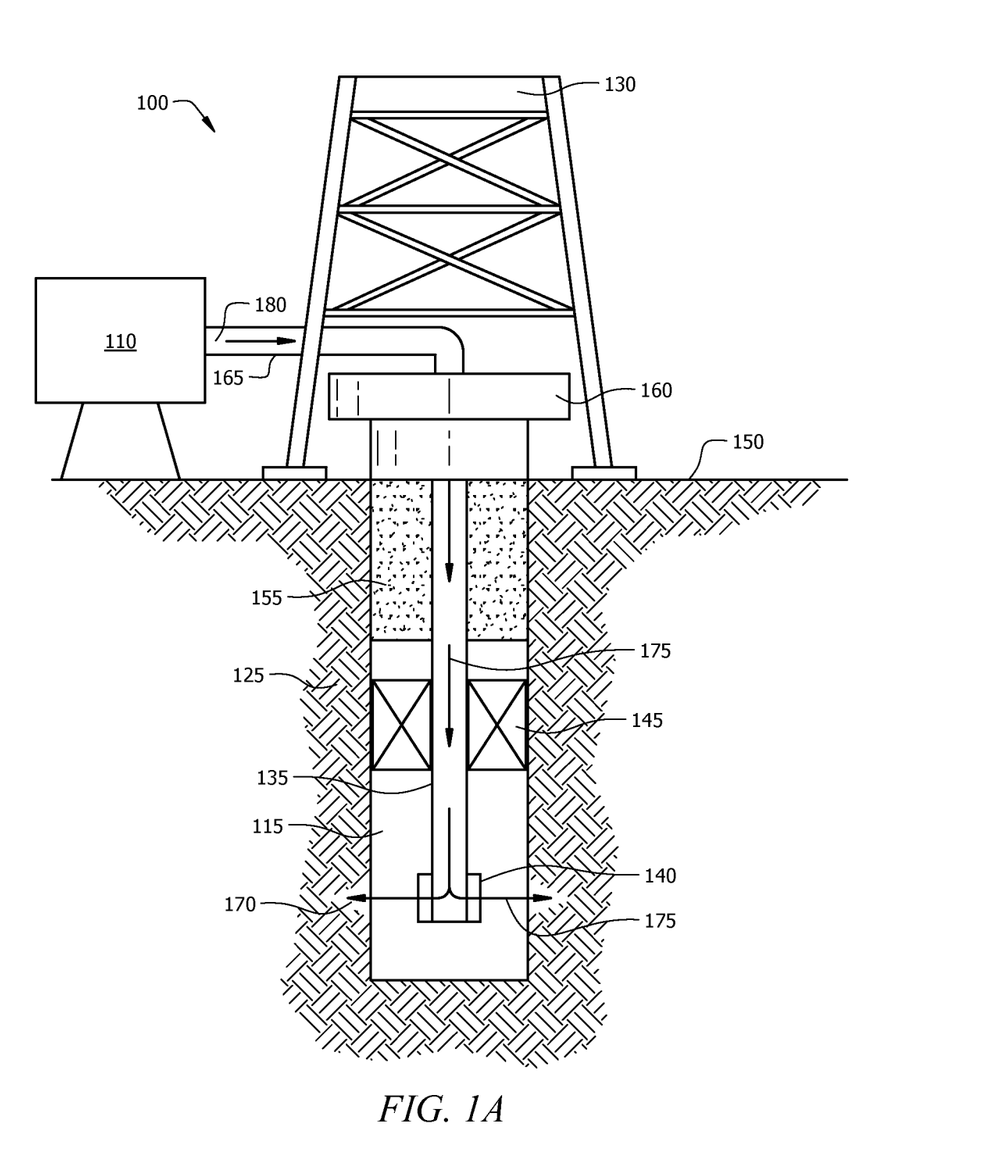
FIG. 1A is a simplified schematic view of an embodiment of a wellbore and a wellbore servicing system for forming a wellbore servicing fluid.
Figure 1B:
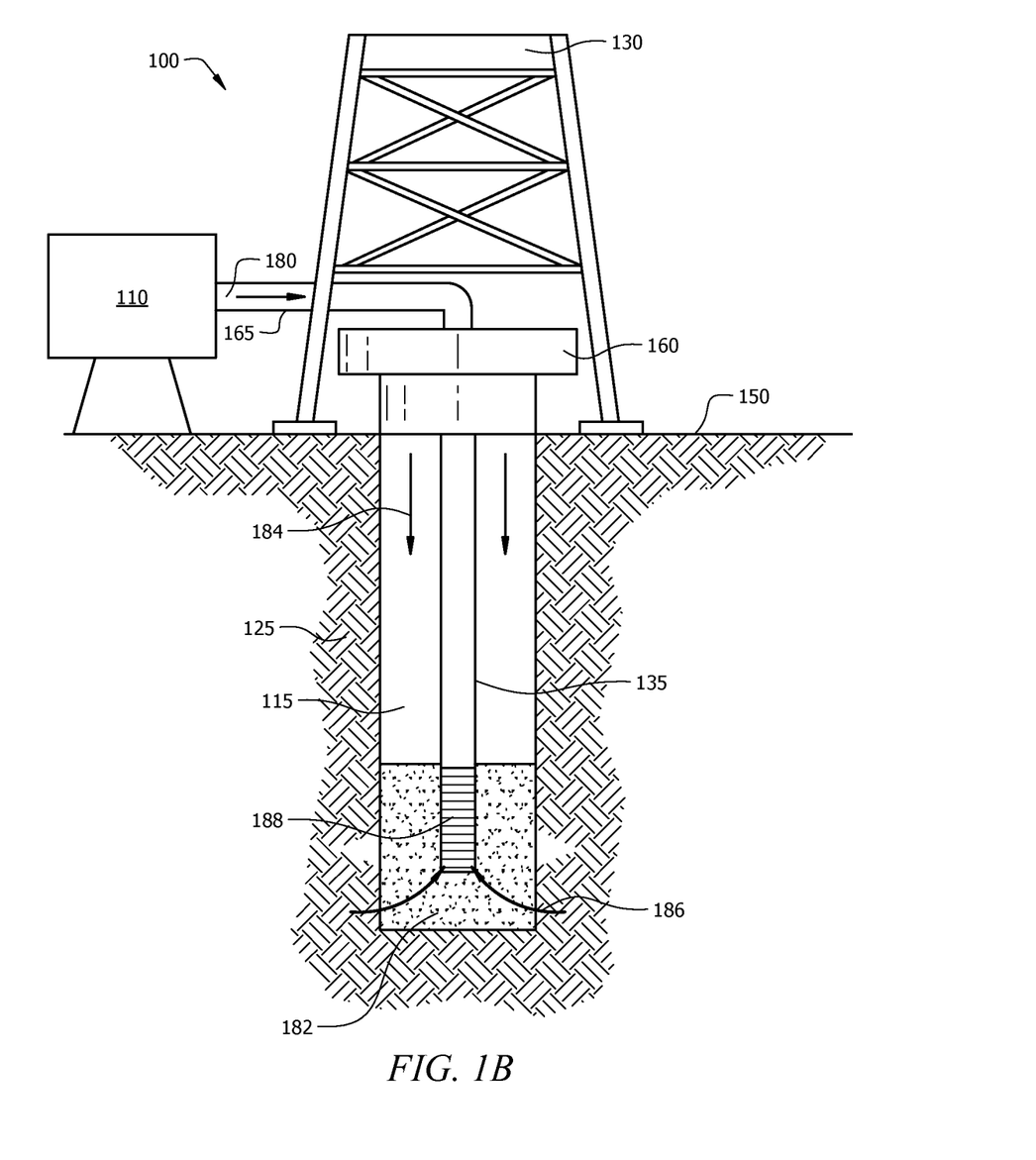
FIG. 1B is a simplified schematic view of an embodiment of a wellbore and a wellbore servicing system for forming a wellbore servicing fluid.

FIGS. 1A and 1B schematically illustrate embodiments of a wellbore and a wellbore servicing system 110 for performing a wellbore servicing operation utilizing a wellbore servicing fluid (WSF). In the embodiments of FIGS. 1A and 1B, the wellbore servicing system 110 is deployed at a wellsite 100 and is fluidly coupled to a wellbore 115 penetrating a subterranean formation 125 for the purpose of recovering hydrocarbons, storing hydrocarbons, disposing of carbon dioxide, or injecting one or more WSFs. The wellbore 115 may be drilled into the subterranean the formation 125 using any suitable drilling technique. In an embodiment, a drilling or servicing rig 130 may generally comprise a derrick with a rig floor through which a tubular string 135 (e.g., a drill string, segmented tubing, coiled tubing, jointed pipe, etc.) may be lowered into the wellbore 115. A wellbore servicing apparatus 140 configured for one or more wellbore servicing operations (e.g., perforating, fracturing, producing hydrocarbons, etc.) may be integrated within the tubular string 135 for the purpose of performing one or more wellbore servicing operations. Additional downhole tools may be included with or integrated within the wellbore servicing apparatus 140 and/or the tubular string 135, for example, one or more isolation devices 145 as illustrated in the embodiment of FIG. 1A (for example, a packer, such as a swellable or mechanical packer) may be positioned within the wellbore 115 for the purpose of isolating a portion of the wellbore 115.

The drilling or servicing rig may be conventional and may comprise a motor driven winch and other associated equipment for lowering the tubular string 135 and/or wellbore servicing apparatus 140 into the wellbore 115. Alternatively, a mobile workover rig, a wellbore servicing unit (e.g., coiled tubing units), or the like may be used to lower the tubular string 135 and/or the wellbore servicing apparatus 140 into the wellbore 115 for the purpose of performing a wellbore servicing operation.

The wellbore 115 may extend substantially vertically away from the earth's surface 150 over a vertical wellbore portion, or may deviate at any angle from the earth's surface 150 over a deviated or horizontal wellbore portion. Alternatively, portions or substantially all of the wellbore 115 may be vertical, deviated, horizontal, and/or curved. In some instances, a portion of the tubular string 135 may be secured into position within the wellbore 115 in a conventional manner using cement 155; alternatively, the tubular string 135 may be partially cemented in wellbore 115; alternatively, the tubular string 135 may be uncemented in the wellbore 115. In an embodiment, the tubular string 135 may comprise two or more concentrically positioned strings of pipe (e.g., a first pipe string such as jointed pipe or coiled tubing may be positioned within a second pipe string such as casing cemented within the wellbore). It is noted that although one or more of the figures may exemplify a given operating environment, the principles of the devices, systems, and methods disclosed may be similarly applicable in other operational environments, such as offshore and/or subsea wellbore applications.

In an embodiment, the wellbore servicing system 110 may be coupled to a wellhead 160 via a conduit 165, and the wellhead 160 may be connected to the tubular string 135. In various embodiments, the tubular string 135 may comprise a casing string, a liner, a production tubing, coiled tubing, a drilling string, the like, or combinations thereof. The tubular string 135 may extend from the earth's surface 150 downward within the wellbore 115 to a predetermined or desirable depth, for example, such that the wellbore servicing apparatus 140 is positioned substantially proximate to a portion of the subterranean formation 125 to be serviced (e.g., a formation interval into which a fracture 170 is to be introduced).

Referring to FIG. 1A, an embodiment of a wellbore servicing operation as may be performed at the wellsite 100 is illustrated. For example, in the embodiment of FIG. 1A, the wellbore 115, tubular string 135, rig 130, and/or wellbore servicing system 110 may be configured to perform a stimulation operation, such as a fracturing and/or perforating operation. In the embodiment of FIG. 1A, flow arrows 180 and 175 indicate a route of fluid communication of a suitable WSF (e.g., a stimulation fluid, such as a fracturing and/or perforating fluid) from the wellbore servicing system 110 to the wellhead 160 via conduit 165, from the wellhead 160 to the wellbore servicing apparatus 140 via tubular string 135, and from the wellbore servicing apparatus 140 into fractures 170 of the subterranean formation 125. The wellbore servicing apparatus 140 may be configured to perform one or more servicing operations, for example, fracturing the formation 125, hydrajetting and/or perforating casing (when present) and/or the formation 125, expanding or extending a fluid path through or into the subterranean formation 125, producing hydrocarbons from the formation 125, another servicing operation, or combinations thereof. In an embodiment, the wellbore servicing apparatus 140 may comprise one or more ports, apertures, nozzles, jets, windows, or combinations thereof suitable for the communication of fluid from a flowbore of the tubular string 135 and/or a flowbore of the wellbore servicing apparatus 140 to the subterranean formation 125. In an embodiment, the wellbore servicing apparatus 140 is actuatable and/or inactuatable, for example, comprising a housing comprising a plurality of housing ports and a sleeve being movable with respect to the housing, the plurality of housing ports being selectively obstructed or unobstructed by the sliding sleeve so as to provide a fluid flowpath to and/or from the wellbore servicing apparatus 140 into the wellbore 115, the subterranean formation 125, or combinations thereof. In an embodiment, the wellbore servicing apparatus 140 may be configurable for the performance of multiple wellbore servicing operations.

Referring to FIG. 1B, another embodiment of a wellbore servicing operation performed at the wellsite 100 is shown. For example, in the embodiment of FIG. 1B, the wellbore 115, tubular string 135, rig 130, and/or wellbore servicing system 110 may be configured to perform a gravel-packing operation. In this embodiment, a WSF (e.g., a gravel-packing fluid) may be formed within the wellbore servicing system 110 and displaced through the wellbore 115 (as shown by flow arrows 184) via an annular space generally defined by the wellbore 115 and the tubular string 135, forming a gravel pack 182 within at least a portion of the wellbore 115. In an embodiment, the gravel pack may allow a formation fluid to move from the subterranean formation 125 through the gravel pack 182 and into the tubular string 135, for example, such that hydrocarbons or other fluids may be produced from the formation 125. In this embodiment, a screen 188 may be coupled to a downhole end of the tubular string, for example, such that the gravel pack 182 will not flow into the tubular string 135 along with produced formation fluids.

Figure 2:
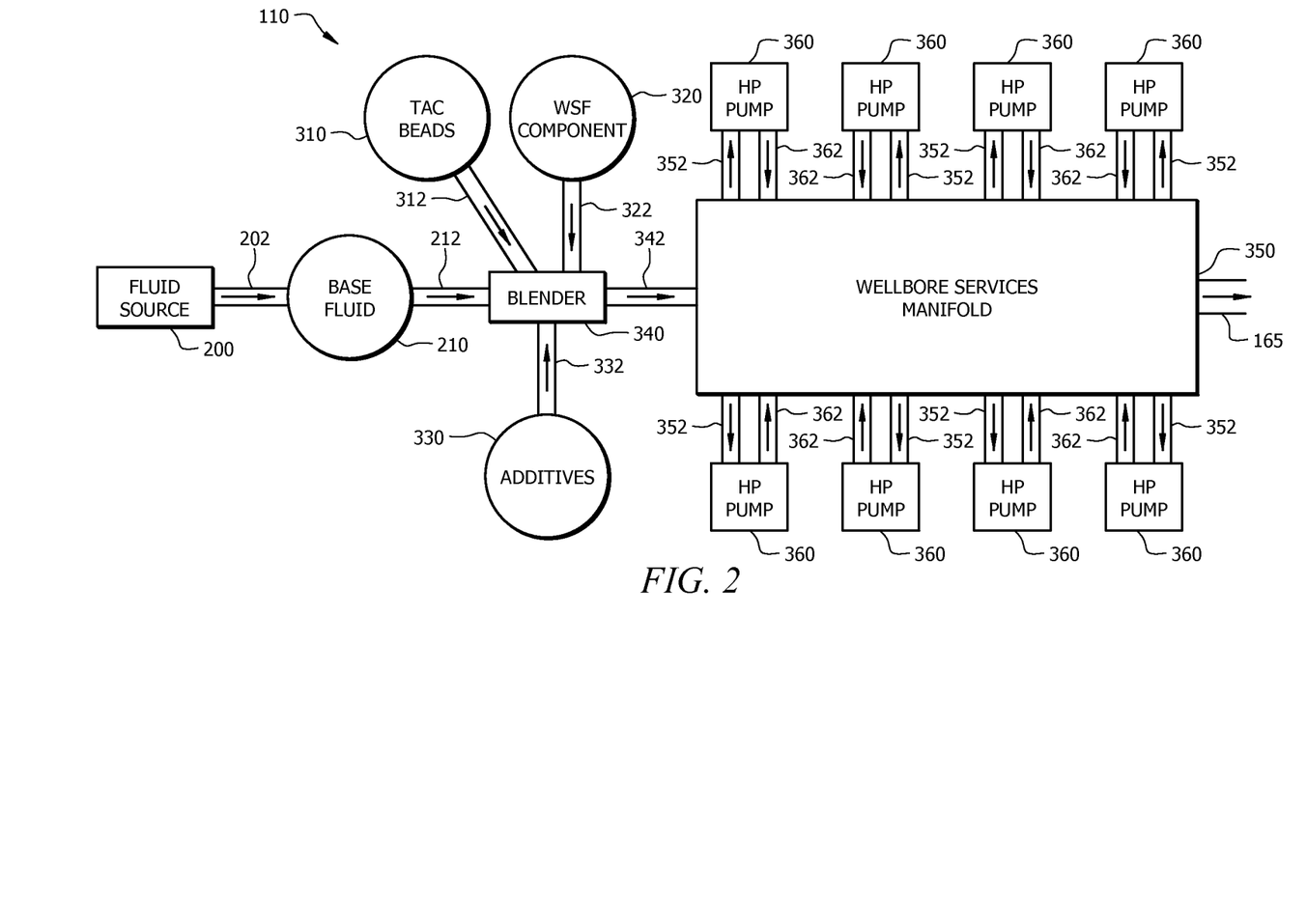
FIG. 2 is a simplified schematic view of an embodiment of a wellbore servicing system.

In an embodiment, the wellbore servicing system generally comprises a flowpath and/or a combination of flowpaths by which a WSF comprising a quantity of template assisted crystallization (TAC) beads, and/or a component of such a WSF, is formed and/or introduced into the wellbore 115. In an embodiment, the wellbore servicing system 110 is configured to deliver the WSF comprising a quantity of TAC beads into the wellbore 115. FIG. 2 schematically illustrates an embodiment of the wellbore servicing system 110. In this embodiment, the wellbore servicing system 110 generally comprises a fluid source 200, one or more storage vessels (such as storage vessels 210, 310, 320, and 330) a blender 340, a wellbore services manifold 350, and one or more high pressure (HP) pumps 360. In the embodiment of FIG. 2, the WSF formed in wellbore servicing system 110 comprises water obtained, either directly or indirectly, from fluid source 200. Water from the fluid source 200 is introduced, either directly or indirectly, into the blender 340 where the water is mixed with a quantity of TAC beads and one or more various other components and/or additives to form the WSF. The WSF is introduced into the wellbore services manifold 350, pressurized in the one or more HP pumps 360 which are in fluid communication with the wellbore services manifold, and then communicated to the wellhead via conduit 165. As will be described herein, the fluid communication between two or more components of the wellbore servicing system 110 may be provided by any suitable flowline or conduit. Persons of ordinary skill in the art with the aid of this disclosure will appreciate that the flowlines described herein may include various configurations of piping, tubing, etc. that are fluidly connected, for example, via flanges, collars, welds, etc. These flowlines may include various configurations of pipe tees, elbows, and the like. These flowlines fluidly connect the various WSF process equipment described herein.

In an embodiment, the fluid source 200 may comprise produced water, flowback water, surface water, a water well, potable water, municipal water, or combinations there. For example, in an embodiment the water obtained from the fluid source 200 may comprise produced water that has been extracted from the wellbore 115 while producing hydrocarbons from the wellbore 115. As discussed above, produced water may comprise dissolved multivalent ions, such as hard ions (e.g., calcium ions, magnesium ions, iron ions, strontium ions, aluminum ions, etc.) and/or other natural or synthetic constituents that are displaced from a hydrocarbon formation during the production of the hydrocarbons or from a wellbore servicing operation. In an additional or alternative embodiment, water obtained from the fluid source 200 may comprise flowback water, for example, water that has previously been introduced into the wellbore 115 during a wellbore servicing operation and subsequently flowed back or returned to the surface. In addition, the flowback water may comprise hydrocarbons, gelling agents, friction reducers, surfactants, and/or remnants of WSFs previously introduced into the wellbore 115 during wellbore servicing operations.

In another additional or alternative embodiment, water obtained from the fluid source 200 may further comprise local surface water contained in natural and/or manmade water features (such as ditches, ponds, rivers, lakes, oceans, etc.). Further, water obtained from the fluid source 200 may comprise water obtained from water wells or a municipal source. Water obtained from the fluid source 200 may comprise water that originated from near the wellbore 115 and/or may be water or another liquid (e.g., a non-aqueous fluid) that has been transported to an area near the wellbore 115 from any distance. Still further, water or another fluid obtained from the fluid source 200 may comprise water stored in local or remote containers. In some embodiments, water obtained from the fluid source 200 may comprise any combination of produced water, flowback water, local surface water, and/or container-stored water. As discussed earlier, local surface water, municipal water, water from local or remote containers, etc., may also include multivalent ions, such as hard ions. In an embodiment, the water from fluid source 200 may be introduced via a conduit 202 into a water storage vessel 210 where it may be temporarily stored prior to being pumped to a mixer or blender 340 via a conduit 212; alternatively, the water may be introduced directly from the fluid source 200 into the blender 340.

In an embodiment, the blender 340 may be configured to mix solid and fluid components to form a well-blended WSF. As depicted in the embodiment of FIG. 2, one or more of a base fluid (e.g., water) from storage vessel 210, TAC Beads from storage vessel 310, a wellbore servicing fluid component from storage vessel 320, and other components such as additives from a storage vessel 330 may be fed into the blender 340 via conduits 212, 312, 322 and 332, respectively. The blender 340 may comprise any suitable type and/or configuration of blender. The mixing conditions of the blender 340, including time period, agitation method, pressure, and temperature of the blender 340, may be chosen by one of ordinary skill in the art with the aid of this disclosure to produce a homogeneous blend having a desirable composition, density, and viscosity. In alternative embodiments, however, sand or proppant, water, and additives may be premixed and/or stored in a storage tank before entering the blender 340. For example, in an embodiment an Advanced Dry Polymer (ADP) blender, which is a commercially available from Halliburton Energy Services, Inc., may be utilized to dry blend one or more dry components, which may then be dry fed into the blender 340. In another embodiment, additives may be pre-blended with water or other liquids, for example, using a GEL PRO blender, which is a commercially available from Halliburton Energy Services, Inc., to form a liquid gel concentrate that may be fed into the blender 340. In the embodiment of FIG. 2, the blender 340 is in fluid communication with a wellbore services manifold 350 via a conduit 342.

In the embodiment of FIG. 2, the WSF may be introduced into the wellbore services manifold 350 from the blender 340 via conduit 342. As used herein, the term "wellbore services manifold" may include a mobile vehicle, such as a truck and/or trailer, comprising one or more manifolds for receiving, organizing, and/or distributing WSFs during wellbore servicing operations. In the embodiment illustrated by FIG. 2, the wellbore services manifold 350 is coupled to eight high pressure (HP) pumps 360 via outlet conduits 352 and inlet conduits 362. In alternative embodiments, however, there may be more or fewer HP pumps 360 used in a wellbore servicing operation. The HP pumps 360 may comprise any suitable type of high pressure pump, a non-limiting example of which is a positive displacement pump. Outlet conduits 352 are outlet lines from the wellbore services manifold 350 that supply fluid to the HP pumps 360. Inlet conduits 362 are inlet lines from the HP pumps 360 that supply fluid to the wellbore services manifold 350. In an embodiment, the HP pumps 360 may be configured to pressurize the WSF (e.g., a fracturing or "fracpac" fluid, a gravel-packing fluid, a proppant-laden fluid, or any other suitable WSF) to a pressure suitable for delivery into the wellhead 160. For example, the HP pumps 360 may increase the pressure of the WSF to a pressure of about 10,000 p.s.i., alternatively, about 15,000 p.s.i., alternatively, about 20,000 p.s.i. or higher.

From the HP pumps 360, the WSF may reenter the wellbore services manifold 350 via inlet conduits 362 and be combined so that the WSF may have a total fluid flow rate that exits from the wellbore services manifold 350 through conduit 165 to the wellbore 115 of between about 1 BPM to about 200 BPM, alternatively from between about 50 BPM to about 150 BPM, alternatively about 100 BPM.

In an embodiment, the WSF generally comprises a base fluid (e.g., water), a quantity of TAC beads, and at least one wellbore servicing fluid component. In an additional embodiment, the wellbore servicing fluid may further comprise one or more additives. As will be disclosed herein, the WSF may comprise any suitable type of wellbore servicing composition, for example, dependent upon the particular wellbore servicing additives included in the WSF, as will be disclosed herein. An example of a suitable WSF includes, but is not limited to, a hydraulic fracturing fluid, a perforating fluid (such as a hydrojetting fluid), an acidizing fluid, a cementitious slurry, a gravel-packing fluid, the like, or combinations thereof.

For example, in an embodiment, the WSF (for example, as may be formed within the wellbore servicing system 110) may be configured and/or formulated for initiating, forming, and/or extending a fracture (such as fractures 170 of FIG. 1A) within a hydrocarbon-bearing formation (such as subterranean formation 125 or a portion thereof). In the performance of a stimulation (e.g., perforating such as by hydro-jetting, and/or fracturing) operation, the WSFs (e.g., perforating and/or fracturing fluids) such as particle (e.g., proppant) laden fluids, are pumped at a relatively high-pressure into the wellbore 115. The particle laden fluids may then be introduced into a portion of the subterranean formation 125 at a pressure, rate, and/or velocity sufficient to cut and/or abrade a casing and/or initiate, create, or to extend perforation tunnels and/or fractures within the subterranean formation 125. Proppants (e.g., grains of sand, glass beads, shells, ceramic particles, or combinations thereof) may be mixed into the WSF, for example, such that a fracture formed during the performance of such a fracturing operation may be "propped" open so that hydrocarbons may be produced from the subterranean formation 125 and flow into the wellbore 115. Hydraulic fracturing may create high-conductivity fluid communication between the wellbore 115 and the subterranean formation 125.

In an alternative embodiment, the WSF (for example, as may be formed within the wellbore servicing system 110) may be configured for forming a gravel pack within the wellbore 115, for example, so as to control the movement (e.g., in-flow) of sand or other particulate matter during the production of hydrocarbons from the subterranean formation 125. In the performance of a gravel-packing operation, WSFs (e.g., gravel-packing fluids) comprising a quantity of gravel are pumped into the wellbore 115. The gravel containing fluid may then be "packed" into the wellbore, such that formation fluid may pass through the gravel before entering an inlet of the tubular string 135. The sizing of the gravel within the WSF may be configured such that a substantial amount of sand from the formation 125 may not pass through the gravel pack formed by the WSF and enter the inlet of the tubular string 135.

As will be appreciated by one of skill in the art upon viewing this disclosure, although one or more of the embodiments disclosed herein are disclosed with reference to a particular type and/or formulation of WSF, the WSFs may include one or more various other types and/or formulations. As will also be appreciated by one of skill in the art upon viewing this disclosure, the concentration of one or more of components of the WSF (e.g., components of the base fluid, additives, etc.) may be varied dependent upon the intended use and/or the intended properties of the WSF.

In an embodiment, the WSF and/or one or more components thereof may be treated, for example, in a fluid treatment system, prior to introduction into a wellbore. Additionally, in an embodiment, such a fluid treatment system may be configured to contact the WSF and/or one or more components thereof with a plurality of TAC beads prior to introduction into the wellbore. Examples of suitable fluid treatment systems, for example, configured for treatment of a fluid with TAC beads, are disclosed in U.S. patent application Ser. No. 13/569,054, by Schultheiss et al. and entitled "Wellbore Servicing System and Methods of Use," which is filed concurrently herewith, and which is incorporated herein by reference in its entirety.

In an embodiment, the base fluid used in forming the WSF may comprise a non-oleaginous fluid (such as a substantially aqueous fluid), an oleaginous fluid, an emulsion, an invert emulsion, or combinations thereof.

In an embodiment, the non-oleaginous fluid generally comprises a suitable aqueous fluid, alternatively, a substantially aqueous fluid (e.g., water, as disclosed herein). In an embodiment, a substantially aqueous fluid comprises less than about 50% of a nonaqueous component, alternatively less than about 45%, 40%, 35%, 30%, 25%, 20%, 15%, 10%, 5%, 4%, 3%, 2% or 1% of a nonaqueous component. Examples of suitable non-oleaginous fluids include, but are not limited to, sea water, freshwater, naturally-occurring and artificially-created brines containing organic and/or inorganic dissolved salts, liquids comprising water-miscible organic compounds, and combinations thereof. In an embodiment, the base fluid comprises an aqueous brine. In such an embodiment, such an aqueous brine generally comprises water and an inorganic monovalent salt, an inorganic multivalent salt, or both. Such an aqueous brine may be naturally occurring or artificially-created. Examples of suitable brines include, but are not limited to, chloride-based, bromide-based, or formate-based brines containing monovalent and/or polyvalent cations and combinations thereof. Examples of suitable chloride-based brines include, but are not limited to, sodium chloride and calcium chloride. Examples of suitable bromide-based brines include, but are not limited to, sodium bromide, calcium bromide, and zinc bromide. Examples of suitable formate-based brines include, but are not limited to, sodium formate, potassium formate, and cesium formate. The salt or salts in the aqueous fluid may be present in an amount ranging from greater than about 0% by weight to a saturated salt solution. In a particular embodiment, the salt or salts in the water may be present within the base fluid in an amount sufficient to yield a saturated brine, alternatively, a nearly saturated brine.

In an embodiment, the oleaginous fluid generally comprises any suitable oil. Examples of a suitable oleaginous fluids include, but are not limited to petroleum oils, natural oils, synthetically-derived oils, or combinations thereof. More particularly, examples of a suitable oleaginous fluid include, but are not limited to, diesel oil, kerosene oil, mineral oil, synthetic oil, such as polyolefins (e.g., alpha-olefins and/or internal olefins), polydiorganosiloxanes, esters, diesters of carbonic acid, paraffins, or combinations thereof.

In an embodiment, the base fluid may comprise both oleaginous and non-oleaginous phases, for example, in the form of an emulsion and/or an invert emulsion. In an embodiment where the base fluid comprises an emulsion and/or an invert emulsion, the concentration of the oleaginous fluid may be present in an amount of less than about 99% by volume of the invert emulsion, alternatively, from about 30% to about 70%, alternatively, about 50% by volume of the emulsion or invert emulsion. Also, in such an embodiment, the non-oleaginous fluid may be present in an amount of less than about 99% by volume of the emulsion or invert emulsion, alternatively, from about 30% to about 70%, alternatively, about 50% by volume of the emulsion or invert emulsion.

In an embodiment, the base fluid may, optionally, comprise one or more additives or additional components, as may be suitable depending upon the end use of the base fluid. In such an embodiment, suitable additives may include an acid (e.g., a hydrochloric acid or a muriatic acid), an iron control additive (e.g., citric acid), a surfactant, a gum (e.g., hydroxyethyl cellulose), a pH adjusting agent (e.g., sodium or potassium carbonate), a corrosion inhibitor (e.g., n,n-dimethyl formamide), a crosslinker (e.g., a borate salt), or combinations thereof.

In an embodiment, the base fluid may be present in the WSF in a suitable amount. For example, in an embodiment, the base fluid may comprise from about 1% to about 99% of the WSF by volume, alternatively, from about 30% to about 90% by volume, alternatively, from about 40% to about 80% of the WSF by volume. In an embodiment, the base fluid may comprise the remainder or balance of the WSF when all other components thereof are considered.

In an embodiment, the WSF comprises a quantity of TAC beads. In an embodiment, the TAC beads may be effective to reduce the concentration of dissolved multivalent ions, such as hard ions (e.g., calcium ions, magnesium ions, iron ions, strontium ions, aluminum ions, etc.) present within a solution or composition. In an embodiment, the TAC beads may be characterized as having a size (e.g., a diameter) of ranging from about 0.500 mm to about 0.900 mm, alternatively, from about 0.550 mm to about 0.850 mm, alternatively, from about 0.600 mm to about 0.800 mm. In an embodiment, the quantity of beads may be characterized as having a mesh size ranging from about 20/40 mesh to about 16/30 mesh. As used herein, the term "mesh" refers to the sizing of a material, according to the standardized Tyler mesh size, will pass through some specific mesh (e.g., such that any particle of a larger size will not pass through this mesh) but will be retained by some specific tighter mesh (e.g., such that any particle of a smaller size will pass through this mesh). In an embodiment, the TAC beads may be characterized as having a size distribution that is the same as, alternatively, substantially the same as, the size distribution of a wellbore servicing fluid component (for example, proppant or gravel, as will be disclosed herein).

Figure 4:
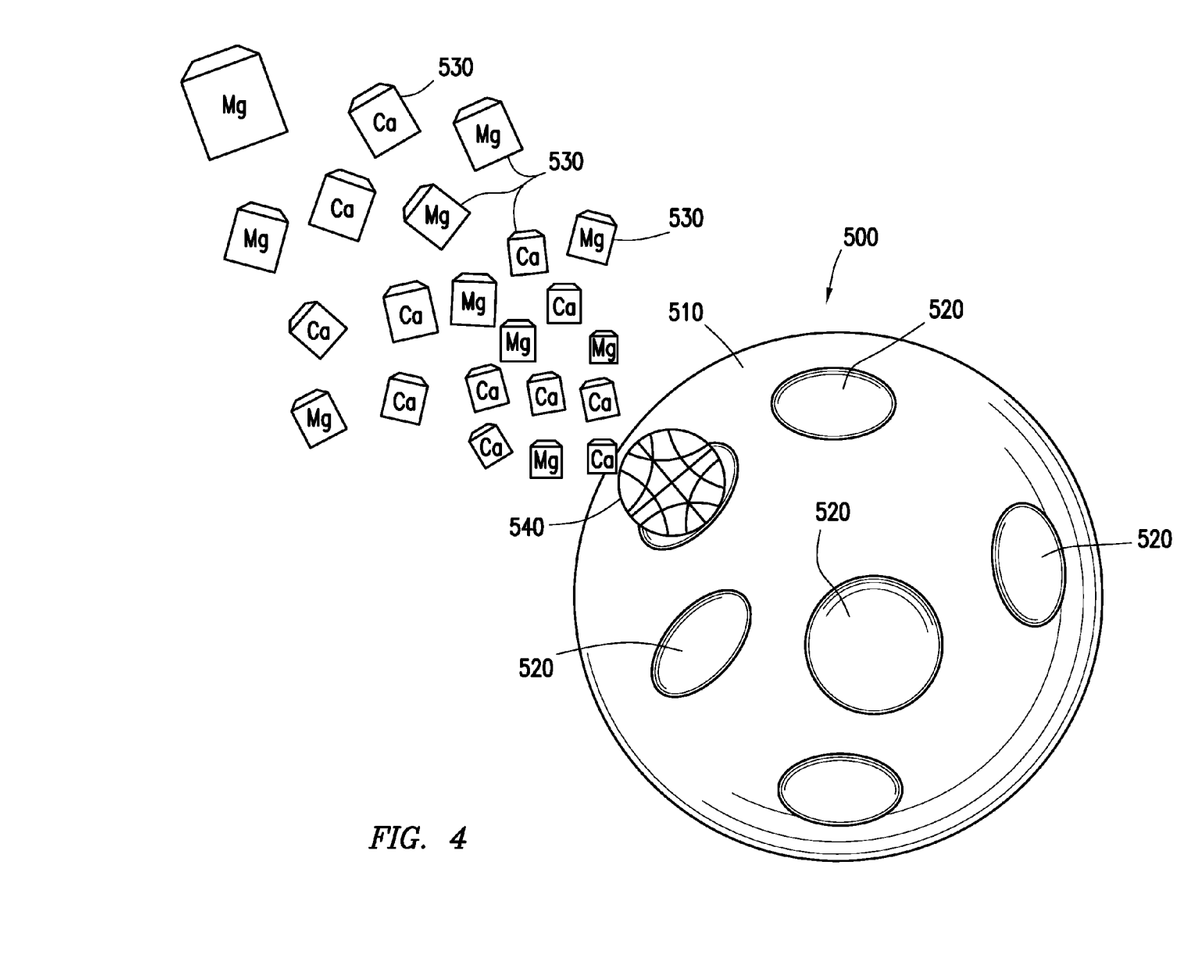
FIG. 4 is a simplified representation showing a template assisted crystallization bead according to certain embodiments of the present disclosure.

An embodiment of a TAC bead according to certain embodiments of the present disclosure is shown in FIG. 4. In an embodiment, TAC bead 500 generally comprises a generally spheroidal body having an outer surface 510. The generally spheroidal body may comprise a polymeric material. For example, in an embodiment, the generally spheroidal body of TAC bead 500 comprises a modified acrylic copolymer, a modified styrenic copolymer, or combinations thereof. Examples of a suitable modified styrenic or acrylic copolymer include, but are not limited to, poly(styrene-co-styrene sulfonate), poly(methyl acrylate), polymethyl methacrylate (PMMA), poly(butyl acrylate), polyvinyl acetate, and combination thereof. Not intending to be bound by theory, in an embodiment, at least a portion (for example, at least 50%, alternatively, at least 60%, 70%, 80%, 90%, or 95%) of the TAC beads 500 are crosslinked with diacrylates, for example, so as to increase the geometric integrity of the TAC beads 500. In an embodiment, the outer, generally spheroidal surface 510 of a given TAC bead 500 may comprise a plurality of templates (e.g., dimples) 520 disposed on and/or at least partially within the outer surface 510 of the generally spheroidal body (e.g., similar in appearance to a golf ball). In an embodiment, the templates 520 may comprise a curved, concave surface geometry. Not intending to be bound by theory, the surface morphology of TAC bead 500, which may comprise a great number of nucleation sites 540, may contribute to the formation of crystals over the surface 510 of TAC bead 500. In an embodiment, the nucleation site 510 may comprise one or more suitable functional moieties, for example, as may contribute to the crystallization of multivalent ions 530. Example of suitable functional moieties may include, but are not limited to, carboxylic acid functional moieties, sulfonate functional moieties, or combinations thereof.

Not seeking to be bound by theory, the TAC beads 500 may be configured to convert dissolved multivalent ions 530 (such as calcium and/or magnesium ions) into inert crystalline solids. For example, not intending to be bound by theory, the templates 520 may act as a site 540 for heterogeneous nucleation. For example, the surface geometry of the templates 520 is configured to provide a lower energy path for the formation of a crystalline solid from a plurality of multivalent (e.g., divalent) ions 530 through the process of nucleation. During nucleation at or within a template 520 disposed on a TAC bead 500, a nucleus of solute molecules (e.g., multivalent ions) 530 is formed and reaches a critical size so as to stabilize within the solvent. Not intending to be bound by theory, once a nucleus has reached the critical size, where the crystalline structure has begun to form, crystal growth of the nucleus may continue until the size of the forming crystal reaches a point where it breaks free from the template 520 of the TAC bead 500. Once the crystal (e.g., an inert crystalline solid) has broken free from the template 520, it may continue absorbing other dissolved ions 530 within the solvent, acting as a site 540 for homogenous nucleation. Not intending to be bound by theory, crystals formed from TAC beads 500 may be kept in the fluid stream, and with their presence, may further accelerate the conversion of dissolves ions 530 into crystals within the fluid stream. As such, the quantity of TAC beads 500 may aid in converting dissolved multivalent ions into inert crystalline solids. An example of suitable TAC beads is commercially available from Next™ Filtration Technologies, Inc. of Lake Worth, Fla. as ScaleStop™. The TAC beads may be provided in a dry form, alternatively, as solution or slurry.

For example, not intending to be bound by theory, the reaction by which a multivalent ion is converted into a crystal (e.g., an inert crystalline solid) at a nucleation site of a TAC bead may react according to the formula:

$$Ca^{+2}+2HCO_3 \rightarrow CaCO_3+H_2O+CO_2 \qquad \text{Formula I}$$

Thus, in the nonlimiting example set forth in Formula I, a multivalent cation (e.g., $Ca^{+2}$) is transformed into a crystal (e.g., $CaCO_3$). In addition, the one or more of the products of the reaction set forth in Formula I may react according to the formula:

$$CO_2+H_2O \rightarrow H_2CO_3 \qquad \text{Formula II}$$

Further, in the nonlimiting example set forth in Formula II, byproducts of the reaction set forth in Formula II (e.g., $H_2O$ and $CO_2$) may react to yield carbonic acid (e.g., $H_2CO_3$), thereby lowering the pH of the fluid stream. In an embodiment, a reduction the pH of the fluid stream may lead to dissolution of existing scale (e.g., scale present within a fluid flowpath with one or more wellbore servicing equipment components (e.g., tubular member 135, wellbore servicing apparatus 140, or various other wellbore servicing equipment).

In an embodiment, the TAC beads may be present within the WSF in a suitable concentration. Such a suitable concentration of TAC beads within the WSF may be in a range from about 0.1% to about 25% of gravel or proppant by volume, alternatively, from about 1 to about 10% v/v of gravel or proppant by volume. In an embodiment, the amount of the TAC beads utilized may vary depending upon the intended use of the WSF, the volume of the WSF, and/or with the anticipated volume and/or flow rate of any other fluid with which the WSF and/or the TAC beads may come into contact. For example, where the WSF will be used to form a fracture within the formation or a gravel pack within the wellbore, as will be disclosed herein, at least a portion of the quantity of TAC beads may come into contact with a formation fluid (e.g., a hydrocarbon and/or water produced from the formation) that is recovered from the wellbore. In such an embodiment, the quantity of TAC beads within the WSF may be varied based upon the anticipated volume and/or flow rate of any such formation fluid. For example, a larger amount of TAC beads may be present within the WSF where a relatively greater flow rate of formation fluid is anticipated. In an embodiment, the concentration of the TAC beads in the WSF may be sufficient to yield a concentration within a gravel pack or proppant pack (e.g., a "fracpac") formed by/from the WSF, as will be disclosed herein, in a range of from about 0.1% to about 50% by volume of the gravel or proppant, alternatively in a range of from about 1% to about 25% by volume, alternatively, in a range of from about 5% to about 15% by volume. For example, in an embodiment, the TAC beads may be present within the WSF in a range of from about 0.1% to about 50% by volume of the gravel or proppant present within the WSF, alternatively in a range of from about 1% to about 25% by volume, alternatively, in a range of from about 5% to about 15% by volume.

In an embodiment, the WSF comprises a quantity of at least one wellbore servicing fluid additive, for example, depending on the wellbore servicing operation. For example, in an embodiment where the wellbore servicing operation comprises a hydraulic fracturing operation, the at least one wellbore servicing fluid component may comprise a quantity of proppant. Nonlimiting examples of suitable proppants include resin coated or uncoated sand, sintered bauxite, ceramic materials, glass beads, shells, hulls, plastics, or combinations thereof. In an embodiment, the proppant may be present within the WSF (e.g., a fracturing fluid) in a range from about 0.1 pounds of proppant per gallon of fracturing fluid to about 25 pounds of proppant per gallon of fracturing fluid, alternatively, from about 0.5 pounds/gallon to about 10 pounds/gallon, alternatively, from about 3 pounds/gallon to about 8 pounds/gallon.

In an alternative embodiment, for example, in an embodiment where the wellbore servicing operation comprises a gravel-packing operation, the at least one wellbore servicing fluid component may comprise a quantity of gravel. The gravel particles are sized such that they are small enough to ensure that sand from the formation cannot penetrate the gravel pack formed by the WSF (e.g., a gravel-packing fluid). In an embodiment, the gravel may be present in the WSF (e.g., a gravel-packing fluid) in a range from about 0.1 pounds of gravel per gallon of gravel-packing fluid to about 15 pounds of gravel per gallon of gravel-packing fluid, alternatively, from about 1 pound/gallon to about 12 pounds/gallon, alternatively, from about 5 pounds/gallon to about 8 pounds/gallon.

In other alternative embodiments, the WSF may comprise any suitable additional type or formulation of fluid as may be suitable for use in a wellbore servicing operation, such as a drilling operation, a hydrajetting or perforating operation, a remediation operation, a fluid loss control operation, a primary or secondary cementing operation, or combinations thereof. For example, in an embodiment, the WSF may comprise a drilling fluid, a hydrajetting or perforating fluid, a fluid loss control fluid, a remedial fluid, a sealant composition, a cementitious slurry, or combinations thereof. One of skill in the art, upon viewing this disclosure, will recognize one or more wellbore servicing fluid components that may be included within the WSF to yield a WSF (for example, of the types set forth herein) so as to be suitable for use in the performance of a wellbore servicing operation.

In an embodiment, the WSF may further comprise one or more additives. Nonlimiting examples of such additives include, but are not limited to, polymers, crosslinkers, friction reducers, defoamers, foaming surfactants, fluid loss agents, weighting materials, latex emulsions, dispersants, vitrified shale and other fillers such as silica flour, sand and slag, formation conditioning agents, hollow glass or ceramic beads, elastomers, carbon fibers, glass fibers, metal fibers, minerals fibers, of combinations thereof. One of skill in the art will appreciate that one or more of such additives may be added, alone or in combination, and in various suitable amounts to yield a WSF of a desired character and/or composition.

Figure 3:
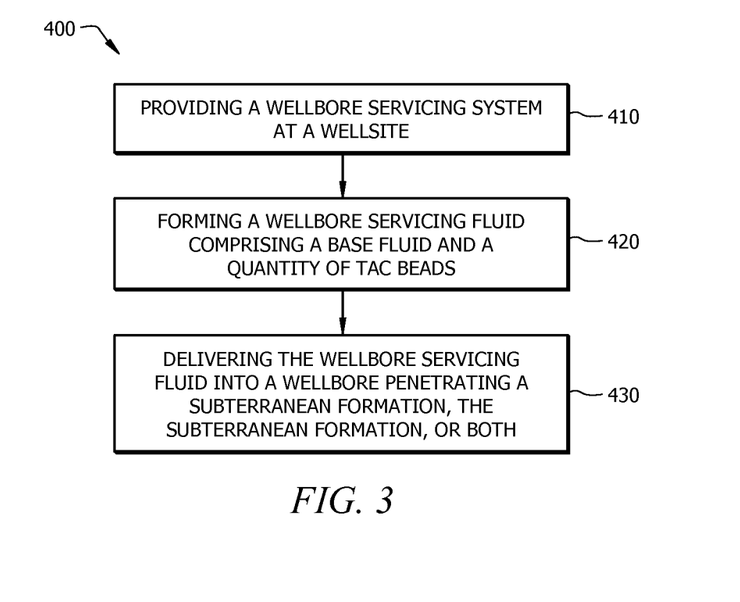
FIG. 3 is a flowchart of a method according to an embodiment of the invention.

One or more embodiments of a WSF and a wellbore servicing system 110 in which such a WSF may be utilized having been disclosed, one or more embodiments of a wellbore servicing method employing such WSF and/or a wellbore servicing system 110 are also disclosed herein. Referring to FIG. 3, a wellbore servicing method 400 is generally described. In the embodiment of FIG. 3, the wellbore servicing method 400 generally comprises the steps of preparing or otherwise procuring a wellbore servicing system at a wellsite (step 410); forming a WSF comprising a base fluid and a quantity of TAC beads (step 420); and delivering the WSF into a wellbore penetrating a subterranean formation, the surrounding subterranean formation, or both (step 430). In an additional embodiment, a wellbore servicing method like wellbore servicing method 400 may further comprise producing a formation fluid from the subterranean formation.

In an embodiment, the wellbore servicing method 400 begins, at step 410, with providing a wellbore servicing system, such as the wellbore servicing system 110 illustrated in FIGS. 1A and 1B, at a wellsite. In an embodiment, the step of providing a wellbore servicing system at a wellsite may comprise providing and/or obtaining access to a wellsite, for example, like wellsite 100 illustrated in FIGS. 1A and 1B, having a wellbore 115 penetrating a subterranean formation 125 or a portion thereof. In an embodiment, such a wellbore 115 may comprise a tubing string like tubing string 135 positioned within the wellbore 115 and a wellhead like wellhead 160 providing access to the tubing string 135. Alternatively, a tubing string may be absent from the wellbore and may later be positioned therein (e.g., via a mobile, coiled-tubing rig or the like), for example, for the purpose of communicating the WSF into the wellbore and/or the formation. In another embodiment, the step of providing a wellbore servicing system at a wellsite may comprise transporting one or more components of the wellbore servicing system to the wellsite. For example, one or more components of wellbore servicing equipment, such as the storage vessels 210, 310, 320, and/or 330, the blender 340, the wellbore services manifold 350, the HP pumps 360, various other servicing equipment, or combinations thereof may be transported to or otherwise provided at the wellsite. In such an embodiment, one or more of any such components may be configured for transport, for example, one or more of such components may be positioned on a truck, a trailer, a skid, a barge, a boat, or other support thereby rendering the servicing equipment mobile. In yet another embodiment, the step of providing a wellbore servicing system at a wellsite may comprise accessing a fluid source, such as the fluid source 200 illustrated in FIG. 2. In such an embodiment and as noted above, the water from the fluid source 200 may comprise flowback water from the formation, municipal water, surface water, other sources of water, or combinations thereof. In an alternative embodiment, for example, in an embodiment where the base fluid comprises a non-aqueous fluid (e.g., an oleaginous fluid), the fluid source may comprise a fluid vessel containing a stored fluid. In still another embodiment, the step of providing a wellbore servicing system at a wellsite may comprise fluidly coupling the components of the wellbore servicing system (e.g., the storage vessels 210, 310, 320, and/or 330, the blender 340, the wellbore services manifold 350, the HP pumps 360, or combinations thereof) to each other, to the fluid source, and/or to the wellbore 115 (e.g., via the wellhead 160), for example, as illustrated in FIGS. 1A, 1B, and 2.

In an embodiment, at step 420, a WSF is formed. In an embodiment, and as noted above, the WSF generally comprises the base fluid and a quantity of TAC beads. Additionally, in an embodiment the WSF further comprises a wellbore servicing fluid component and/or one or more additives. In an embodiment, the step of forming a WSF comprises introducing the WSF the base fluid, the quantity of TAC beads, and, where present the wellbore servicing fluid component and/or additives, in the blender 340 and mixing or blending to yield a sufficiently well-mixed composition.

In an embodiment, the base fluid, the TAC beads, the wellbore servicing fluid component (e.g., gravel, proppant, or other components), and/or the additives may be added and mixed in any suitable order to form the WSF. In an embodiment, the order of mixing the components of the WSF may vary. Additionally or alternatively, in an embodiment two or more of the base fluid, the TAC beads, the wellbore servicing fluid component (e.g., gravel, proppant, or other components), and/or the additives may be pre mixed (e.g., to concentrate prior, such as a gel concentrate) prior to mixing with one or more other components of the WSF.

In an embodiment, at step 430, the WSF is delivered into either a subterranean formation (e.g., formation 125), a wellbore formed within the subterranean formation (e.g., wellbore 115), or both. In an embodiment, the step of delivering the WSF into the wellbore, the subterranean formation, or both may comprise pressurizing the WSF for example, via the operation one or more high-pressure pumps (e.g., HP pump 360) and a wellbore manifold (e.g., wellbore services manifold) to a pressure suitable for performing the wellbore servicing operation.

For example, in an embodiment where the WSF is utilized in the performance of a fracturing operation, the WSF may be delivered at a pressure and rate sufficient to form or extend a fracture (e.g., fracture 170) in a subterranean formation and to deposit a proppant layer or bed (e.g., comprising TAC beads) therein. In such an embodiment, the step of delivering the WSF (e.g., a fracturing fluid) may further comprise disposing the WSF including TAC beads within the fracture. Additionally, in such an embodiment, at least a portion of the TAC beads may remain within the fracture, along with a quantity of proppant, following the fracturing operation.

In another embodiment where the WSF is utilized in the performance of a gravel-packing operation, the WSF may be delivered into the wellbore at a pressure and rate suitable for forming a gravel pack (e.g., gravel pack 182) comprising the WSF and TAC beads within the wellbore. In such an embodiment, the step of delivering the WSF (e.g., a gravel-packing fluid) may further comprise disposing the WSF including the TAC beads within the gravel pack formed in the wellbore. Additionally, in such an embodiment, at least of portion of the TAC beads may remain within the gravel pack, along with a quantity of gravel, following the gravel-packing operation.

In an embodiment, a formation fluid (e.g., hydrocarbons and/or water) may be produced from the subterranean formation. For example, in an embodiment where the WSF comprises a fracturing fluid as disclosed herein, a formation fluid may be allowed to flow (e.g., via a formed, propped fracture) into the wellbore and to the surface (e.g., via the wellbore). In such an embodiment, the formation fluid may pass through a proppant pack containing a plurality of TAC beads, as may result from the methods and/or the WSF disclosed herein. In such an embodiment, as the formation fluid passes through proppant pack comprising the plurality of TAC beads, the formation fluid may contact at least a portion of the of TAC beads, thereby lowering the concentration of multivalent ions (e.g., hard ions) within the formation fluid.

In another embodiment, for example, in an embodiment where the WSF comprises a gravel-packing fluid as disclosed herein, a formation fluid may be allowed to flow into the wellbore and to enter the tubular string (e.g., a production string). In such an embodiment, the formation fluid may pass through a gravel pack comprising a plurality of TAC beads, as may result from the methods and/or the WSF disclosed herein. In such an embodiment, as the formation fluid passes through the gravel pack comprising the plurality of TAC beads, the formation fluid may contact the at least a portion of the TAC beads, thereby reducing the concentration of multivalent ions (e.g., hard ions) within the formation fluid.

In an embodiment, a WSF, such as the WSF disclosed herein, and/or a wellbore servicing method, such as wellbore servicing method 400, may be advantageously employed in the performance of a wellbore servicing operation. For example, as disclosed herein, a concentration of multivalent ions, such as hard ions (e.g., calcium ions, magnesium ions, strontium ions, aluminum ions, etc.) may be substantially reduced within formation fluids produced from a formation, such as formation fluids produced from the subterranean formation 125. Also, the presence of TAC beads within a wellbore servicing fluid (e.g., and the resultant wellbore and/or formation via a propped bed or pack, gravel pack, filter cake, and the like) may decrease the concentration of multivalent ions within that fluid. Conventional means of reducing the concentration of multivalent ions, for example, various chemicals, such as water softening chemicals, may also not be effective when included within a WSF and/or may undesirably alter the character or composition of the WSF, and the present disclosure provides a suitable alternative. Further, the addition of such chemicals to a wellbore servicing fluid may adversely affect the performance of such a fluid and/or be harmful to the environment. As such, the instantly-disclosed compositions and methods allow for a reduction of multivalent ions in wellbore servicing fluids and produced (e.g., formation) fluids, thereby decreasing the incidence of scaling of various servicing equipment, within the wellbore, and/or within the formation. As such, the instantly-disclosed compositions and methods allow for improved productivity of formation fluids and decreased downtime resulting from scaling, corrosion, or other damage due to the present of multivalent ions.

Additional Disclosure

The following are nonlimiting, specific embodiments in accordance with the present disclosure:

A first embodiment, which is a wellbore servicing composition comprising:
 a base fluid, the base fluid comprising a substantially aqueous fluid, a brine, an emulsion, an invert emulsion, an oleaginous fluid, or combinations thereof;
 a quantity of template assisted crystallization beads; and
 a wellbore servicing fluid component, the wellbore servicing fluid component comprising a quantity of proppant, a quantity of gravel, or combinations thereof.

A second embodiment, which is the composition of the first embodiment, wherein the servicing fluid comprises a fracturing fluid, a gravel-packing fluid, or combinations thereof.

A third embodiment, which is the composition of one of the first through the second embodiments, wherein the template assisted crystallization beads comprise a styrenic polymer, an acrylic polymer, or combinations thereof.

A fourth embodiment, which is the composition of one of the first through the third embodiments, wherein the template assisted crystallization beads are configured to provide a plurality of nucleation sites for the crystallization of divalent metal ions.

A fifth embodiment, which is the composition of the fourth embodiment, wherein the plurality of nucleation sites comprise carboxylic acid functional moieties, sulfonate functional moieties, or combinations thereof.

A sixth embodiment, which is the composition of one of the first through the fifth embodiments, wherein the template assisted crystallization beads are present in the wellbore servicing composition in an amount from about 0.1% to about 50% by the wellbore servicing fluid component.

A seventh embodiment, which is a wellbore servicing system comprising:
 a flowpath, the flowpath comprising:
  at least one component of wellbore servicing equipment; and
  a conduit extending from the at least one component of wellbore servicing equipment to a wellbore; and
 a wellbore servicing fluid disposed within the flowpath, wherein the wellbore servicing fluid comprises a plurality of template assisted crystallization beads.

An eighth embodiment, which is the system of the seventh embodiment, wherein the at least one component of wellbore servicing equipment comprises a pump, a mixer, a fluid manifold, or combinations thereof.

A ninth embodiment, which is the system of one of the seventh through the eighth embodiments, wherein the wellbore servicing fluid comprises a fracturing fluid, a gravel-packing fluid, or combinations thereof.

A tenth embodiment, which is the system of one of the seventh through the ninth embodiments, wherein the flowpath further comprises a tubular string disposed within the wellbore.

An eleventh embodiment, which is the system of one of the seventh through tenth embodiments, wherein the flowpath further comprises a fracture within the subterranean formation.

A twelfth embodiment, which is a wellbore servicing method comprising:
 forming a wellbore servicing fluid comprising a quantity of template assisted crystallization beads; and
 introducing the wellbore servicing fluid into a wellbore, a subterranean formation, or combinations thereof.

A thirteenth embodiment, which is the method of the twelfth embodiment, wherein forming the wellbore servicing fluid comprises:
 providing a base fluid;
 adding the quantity of template-assisted to the base fluid;
 adding one or more wellbore servicing fluid components to the base fluid; and
 mixing to form the wellbore servicing fluid.

A fourteenth embodiment, which is the method of the thirteenth embodiment, wherein base fluid comprises a substantially aqueous fluid, a brine, an emulsion, an invert emulsion, an oleaginous fluid, or combinations thereof.

A fifteenth embodiment, which is the method of one of the thirteenth through the fourteenth embodiments, wherein the one or more wellbore servicing fluid components comprise a quantity of proppant, a quantity of gravel, or combinations thereof.

A sixteenth embodiment, which is the method of one of the twelfth through the fifteenth embodiments, further comprising forming a gravel pack with the wellbore servicing fluid.

A seventeenth embodiment, which is the method of the sixteenth embodiment, wherein at least a portion of the quantity of template assisted crystallization beads are disposed within the gravel pack.

An eighteenth embodiment, which is the method of one of the twelfth throught the seventeenth embodiments, further comprising introducing the wellbore servicing fluid into a fracture.

A nineteenth embodiment, which is the method of the eighteenth embodiment, wherein at least a portion of the quantity of template assisted crystallization beads are disposed within the fracture.

A twentieth embodiment, which is the method of one of the twelfth through the nineteenth embodiments, further comprising producing a fluid from the subterranean formation.

A twenty-first embodiment, which is a method of forming a proppant pack and/or a gravel pack within a subterranean formation, within a wellbore, or combinations thereof, wherein the proppant pack and/or the gravel pack comprises template assisted crystallization beads, the method comprising:
    forming a wellbore servicing fluid comprising a quantity of template assisted crystallization beads; and
    introducing the wellbore servicing fluid into the wellbore, the subterranean formation, or combinations thereof.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Detailed Description of the Embodiments is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A wellbore servicing system comprising:
    a flowpath, the flowpath comprising:
        at least one component of wellbore servicing equipment; and
        a conduit extending from the at least one component of wellbore servicing equipment to a wellbore;
    a proppant pack or a gravel pack disposed in or adjacent to the wellbore that comprises a plurality of polymeric template assisted crystallization beads; and
    a wellbore servicing fluid disposed within the flowpath, wherein the wellbore servicing fluid comprises the plurality of polymeric template assisted crystallization beads, wherein the polymeric template assisted crystallization beads each comprise:
    a particulate comprising at least one polymer selected from the group consisting of: a modified acrylic copolymer, a modified styrenic copolymer, and any combination thereof; and
    one or more dimples on the surface of the particulate having a concave surface geometry that act as a nucleation site and convert multivalent ions into inert crystalline solids, wherein the nucleation site further comprises at least one functional moiety selected from the group consisting of: a carboxylic acid functional moiety, a sulfonate functional moiety, and any combination thereof.

2. The system of claim 1, wherein the at least one component of wellbore servicing equipment comprises a pump, a mixer, a fluid manifold, or combinations thereof.

3. The system of claim 1, wherein the flowpath further comprises a tubular string disposed within the wellbore.

4. The system of claim 1, wherein the flowpath further comprises a fracture within the subterranean formation.

5. The system of claim 4 wherein the proppant pack resides within the fracture.

6. The system of claim 1 wherein:
    the polymeric template assisted crystallization beads each have a mesh size of from about 20/40 mesh to about 16/30 mesh.

7. A method of forming a proppant pack and/or a gravel pack within a subterranean formation, within a wellbore, or combinations thereof, wherein the proppant pack and/or the gravel pack comprises template assisted crystallization beads, the method comprising:
    forming a wellbore servicing fluid comprising a quantity of template assisted crystallization beads, wherein the polymeric template assisted crystallization beads each comprise:

a particulate comprising at least one polymer selected from the group consisting of: a modified acrylic copolymer, a modified styrenic copolymer, and any combination thereof; and one or more dimples on the surface of the particulate having a concave surface geometry that act as a nucleation site, wherein the nucleation site further comprises at least one functional moiety selected from the group consisting of: a carboxylic acid functional moiety, a sulfonate functional moiety, and any combination thereof;

introducing the wellbore servicing fluid into the wellbore, the subterranean formation, or combinations thereof; and allowing the template assisted crystallization beads to convert multivalent ions into inert crystalline solids at or within the one or more dimples on the template assisted crystallization beads.

8. The method of claim 7, wherein forming the wellbore servicing fluid comprises:
providing a base fluid;
adding the quantity of template-assisted crystallization beads to the base fluid;
adding one or more wellbore servicing fluid components to the base fluid; and
mixing to form the wellbore servicing fluid.

9. The method of claim 8, wherein the base fluid comprises a substantially aqueous fluid, a brine, an emulsion, an invert emulsion, an oleaginous fluid, or combinations thereof.

10. The method of claim 7, further comprising producing a fluid from the subterranean formation.

11. The method of claim 7 wherein:
the polymeric template assisted crystallization beads each have a mesh size of from about 20/40 mesh to about 16/30 mesh.

* * * * *